(12) United States Patent
Perkinson et al.

(10) Patent No.: US 8,162,611 B2
(45) Date of Patent: Apr. 24, 2012

(54) CONTROLLABLE PITCH PROPELLER WITH ELECTRICAL POWER GENERATION

(75) Inventors: Robert H. Perkinson, Somers, CT (US); David V. Arel, Richmond, VA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 441 days.

(21) Appl. No.: 12/436,753

(22) Filed: May 6, 2009

(65) Prior Publication Data
US 2010/0021295 A1 Jan. 28, 2010

Related U.S. Application Data

(60) Provisional application No. 61/134,912, filed on Jul. 15, 2008.

(51) Int. Cl.
*B64C 11/44* (2006.01)
(52) U.S. Cl. ........................................ 416/162
(58) Field of Classification Search ........... 416/47, 416/48, 157 B, 162
See application file for complete search history.

(56) References Cited

U.S. PATENT DOCUMENTS

| | | |
|---|---|---|
| 2,373,360 A | 4/1945 | Walsh |
| 3,370,652 A | 2/1968 | Stranks |
| 3,560,108 A | 2/1971 | Lindahl |
| 3,900,274 A | 8/1975 | Johnston et al. |
| 4,556,366 A * | 12/1985 | Sargisson et al. ............ 416/155 |
| 5,122,036 A | 6/1992 | Dickes et al. |
| 5,186,608 A | 2/1993 | Bagge |
| 5,205,712 A | 4/1993 | Hamilton |
| 5,281,094 A | 1/1994 | McCarty et al. |
| 5,897,293 A | 4/1999 | Arel et al. |
| 6,483,436 B1 | 11/2002 | Emaci et al. |
| 6,729,844 B2 | 5/2004 | Bettencourt |
| 6,811,376 B2 | 11/2004 | Arel et al. |
| 6,851,929 B2 | 2/2005 | Goldberg |
| 6,923,622 B1 * | 8/2005 | Dehlsen ................. 416/87 |
| 7,172,391 B2 | 2/2007 | Carvalho |
| 7,354,022 B2 | 4/2008 | Richter et al. |
| 7,375,645 B2 | 5/2008 | Tsai |
| 2005/0135929 A1 | 6/2005 | Waddleton |

FOREIGN PATENT DOCUMENTS

| | | |
|---|---|---|
| EP | 0154808 | 9/1985 |
| GB | 545195 | 5/1942 |
| GB | 2225613 | 6/1990 |

OTHER PUBLICATIONS

UK Combined Search and Examination Report, dated Oct. 26, 2009.

* cited by examiner

*Primary Examiner* — Chandra Chaudhari
(74) *Attorney, Agent, or Firm* — Carlson Gaskey & Olds P.C.

(57) ABSTRACT

A propeller system includes a rotor hub which supports a multiple of propeller blades. An electrical generator is mounted between a gearbox and the rotor hub to generate electrical power to drive a pitch change system within the rotor hub.

19 Claims, 2 Drawing Sheets

CONTROLLABLE PITCH PROPELLER WITH ELECTRICAL POWER GENERATION

The present disclosure claims priority to U.S. Provisional Patent Disclosure Ser. No. 61/134,912, filed Jul. 15, 2008.

BACKGROUND

The present disclosure relates to a propeller system, and more particularly to a propeller system with electrical power generation and pitch control within a rotating frame of reference.

Typical propeller pitch change systems utilize a hydromechanical actuator to provide power for pitch change. This is an effective solution for engine applications that provide a sufficient high pressure hydraulic supply path into the rotating reference frame. Some engine applications, however, have architecture that complicates provisions for high pressure hydraulics such as pusher propeller applications, counter-rotating propeller applications, and tractor propeller applications where the gearbox may not readily support access into an inner diameter of a propeller shaft.

Various electrically powered propeller pitch change mechanisms have been implemented. The electrical power required to provide propeller pitch change actuation is quite significant and supplied by an engine-driven generator within a stationary reference frame. Such power requirements necessitate relatively heavy, high current slip-ring assemblies to transmit electricity from the stationary reference frame to the rotating reference frame.

SUMMARY

A propeller system according to an exemplary aspect of the present disclosure includes a rotor hub which supports a multiple of propeller blades. A pitch change system within the rotor hub, the pitch change system operable to vary a pitch of the multiple of propeller blades. An electrical generator mounted between a gearbox and the rotor hub to generate electrical power to drive the pitch change system.

A method of pitch control of a propeller system according to an exemplary aspect of the present disclosure includes generating electrical power within a rotational frame of reference and communicating the electrical power to a pitch change system within the rotational frame of reference to vary a pitch of a multiple of propeller blades.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
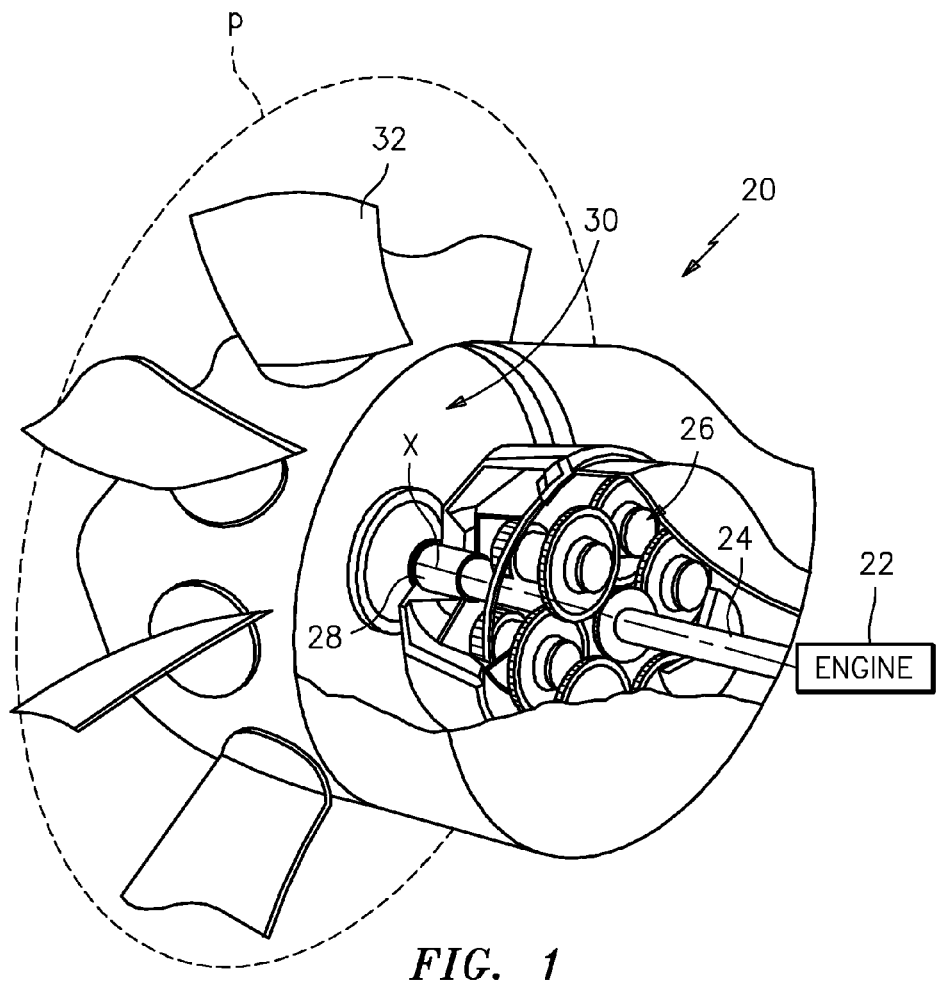
FIG. 1 is a general partial phantom perspective view an exemplary gas turbine turboprop engine embodiment of a propeller system.

FIG. 1 schematically illustrates a propeller system 20 such as that for an aircraft. It should be understood that although a propeller system typical of a turboprop aircraft is illustrated in the disclosed embodiment, various aircraft configurations and/or machines such as such as high speed compound aircraft, turbo-props, tilt-rotors and other machines such as wind turbines will benefit from the present disclosure.

The propeller system 20 in one non-limiting embodiment is powered by a gas turbine engine 22 (illustrated schematically) which rotates a turbine output shaft 24 at a high speed. The turbine output shaft 24 drives a gearbox 26 (illustrated schematically) which in general decreases shaft rotation speed and increase output torque. The gearbox 26 drives a propeller shaft 28 which rotates a propeller hub 30 and a plurality of propeller blades 32 which extend therefrom. It should be understood that propeller blades 32 as utilized herein include various aerodynamic surfaces such as blades, rotors, prop-rotors and others. In the disclosed non-limiting embodiment, the turbine output shaft 24 and the propeller shaft 28 rotate about a common axis X. Axis X is substantially perpendicular to a plane P which is defined by the propeller blades 32.

Figure 2:
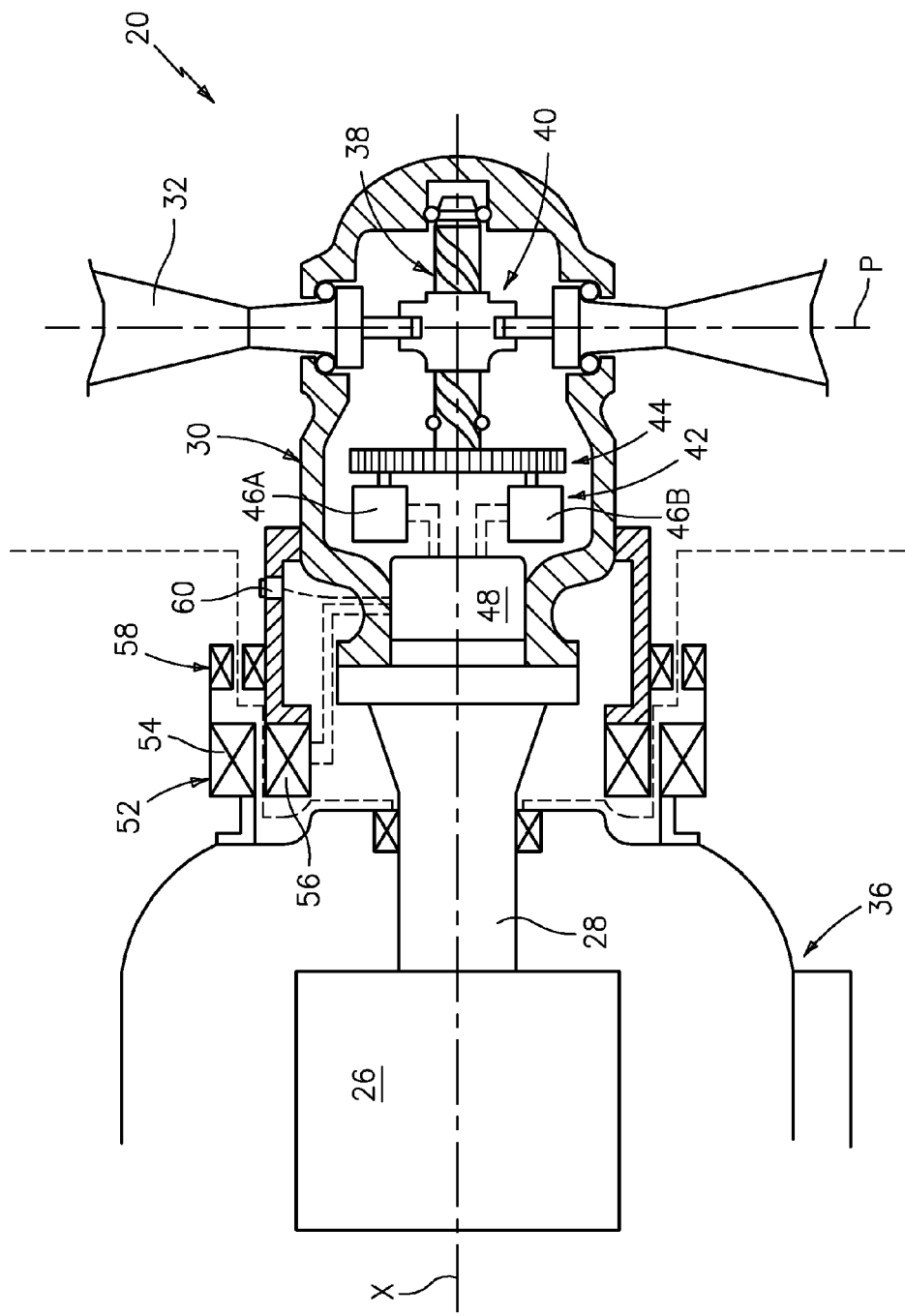
FIG. 2 is a schematic view of a propeller system according to one non-limiting embodiment.

Referring to FIG. 2, the gearbox 26 is within a stationary reference frame while the propeller system 20 is within a rotating reference frame. That is, the gearbox 26 is fixed structure typically attached, for example to an aircraft airframe 36 (illustrated schematically) while the propeller system 20 rotates relative thereto in a rotational reference frame.

A pitch change system 38 such as a ball screw actuator, linear actuator, or other system within the rotor hub 30 operates to vary a pitch of the propeller blades 32. Axial movement of the pitch change system 38 along axis X drives a linkage 40 attached to each propeller blade 32. The linkage 40 may be offset from the propeller axis P such that as the pitch change system 38 transits axially along axis X, the linkage 40 is rotated in an arcuate manner about axis P to effectuate a pitch change of the propeller blades 32.

A pitch change electric motor system 42 within the rotor hub 30 drives the pitch change system 38 through a pitch change gearbox 44. For redundancy, the pitch change electric motor system 42 may include a first motor 46A and a second motor 46B which drive the pitch change gearbox 44 to assure redundant operation of the pitch change system 38.

Figure 3:
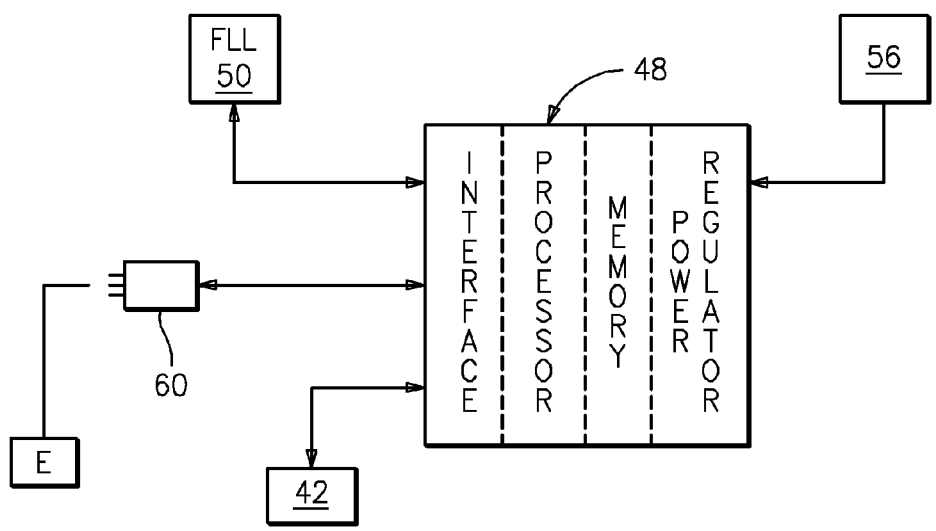
FIG. 3 is a schematic view of a control module for the propeller system.

A controller 48 located within the rotor hub 30 communicates electrical power and control signals to the pitch change electric motor system 42. The controller 48 typically includes a processor, a memory, and an interface (FIG. 3). The processor may be any type of known microprocessor having desired performance characteristics. The memory may, for example only, include UVPROM, EEPROM, FLASH, RAM, ROM, DVD, CD, a hard drive, or other computer readable medium which stores the data and control algorithms to provide the operations described herein. The interface facilitates communication with a flight control computer 50 as well as other avionics and systems to control the pitch of the propeller blades 32.

The pitch change electric motor system 42 may include integral electrical feedback such that the controller 48 will monitor the position of the pitch change electric motor system 42 and thus the propeller blades 32 for purposes of, for example, control and health monitoring. Travel of the propeller blades 32 in the low pitch direction may be selectively restricted with, in one non-limiting embodiment, magnetic detents in the electric motors 46A, 46B with sufficient torque such that the pitch change system 38 cannot be inadvertently back driven by the blade pitch change loads.

An electrical generator 52 is mounted across the rotational reference frame and the stationary reference frame to generate electrical power from the differential rotation between the rotor hub 30 and the gearbox 26. A stator 54 of the electrical generator 52 is mounted to the gearbox 26 and a rotor 56 of the electrical generator 52 is mounted to the rotor hub 30. Electrical power generated by the electrical generator 52 is communicated directly to the controller 48 and the electric motor system 42 without having to cross the stationary/rotational reference frame boundary. Alternately, in the specific case of an application in which the turbine output shaft 24 and the propeller shaft 28 rotate about a common axis X, axial stator 54 could be mounted to rotate with the turbine output shaft 24 with rotor 56 being mounted to the rotor hub 30. This would provide increased differential rotation speed between the stator 54 and rotor 56, which may facilitate a reduction in the size of the electrical generator 52.

The only requirement for communication across the boundary between the stationary reference frame and the rotational reference frame is that of a low power control signal communication system 58 which communicates control signals from the aircraft such as the flight control computer 50 to the controller 48. The low power control signals may be digital signals for robustness and may be transmitted by any number of communication systems such as, for example, high frequency radio, low power brushes and slip rings, inductive couplings, capacitive couplings, and others.

A connector 60 which operates to provide power and control signals from an external source E (FIG. 3) to the controller 48 may be mounted within the rotor hub 30. The connector 60 provides power and control signals directly to the controller 48 of the propeller system 20 when not operational to, for example, provide ground maintenance and diagnostic operations.

The propeller system 20 disclosed herein eliminates complex hydraulic systems required for applications such as pusher propeller, counter-rotating propeller, and tractor propeller applications where the gearbox does not support access to the propshaft. The propeller system 20 thereby eliminates leakage, and maintenance associated with propeller hydraulic systems and facilitates support of engine manufacturer initiatives for more-electric engines through elimination of propeller hydraulics.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:
1. A propeller system comprising:
   a multiple of propeller blades;
   a rotor hub which supports said multiple of propeller blades,
   a pitch change system within said rotor hub, said pitch change system operable to vary a pitch of said multiple of propeller blades;
   a gearbox which drives said rotor hub about an axis of rotation; and
   an electrical generator mounted between said gearbox and said propeller hub to generate electrical power to drive said pitch change system.

2. The system as recited in claim 1, wherein said pitch change system is defined along said axis of rotation.

3. The system as recited in claim 1, further comprising a pitch change electric motor system within said rotor hub to drive said pitch change system.

4. The system as recited in claim 3, wherein said pitch change electric motor system includes at least a first electric motor and may include additional motors to assure redundant operation of said pitch change system.

5. The system as recited in claim 4, wherein pitch travel of said multiple of propeller blades in a low pitch direction is selectively restricted with magnetic detents defined by said first electric motor and a second electric motor, said magnetic detents of sufficient torque such that said pitch change system cannot be back driven by propeller blade pitch change loads.

6. The system as recited in claim 1, further comprising a controller within said rotor hub, said controller in electrical communication with said electrical generator and said pitch change system.

7. The system as recited in claim 6, further comprising a low power control signal communication system which communicates control signals from the stationary frame of reference to the controller.

8. The system as recited in claim 6, further comprising a connector within said rotor hub, said connector operates to provide power and control signals from an external source to said controller.

9. The system as recited in claim 1, wherein said electrical generator is mounted around a propeller shaft which drives said rotor hub, said propeller head driven by said gearbox.

10. A method of pitch control for a propeller system comprising:
    generating electrical power within a rotational frame of reference; and
    communicating the electrical power to a pitch change system within the rotational frame of reference to vary a pitch of a multiple of propeller blades.

11. A method as recited in claim 10, wherein generating electrical power further comprises driving an electrical generator with the relative rotation between a rotor hub and a gearbox.

12. A method as recited in claim 10, further comprising:
    communicating a control signal from a stationary frame of reference into the rotational frame of reference to control the pitch change system.

13. A method as recited in claim 10, further comprising:
    driving a multiple of electric motors within the pitch change system to provide failsafe operation.

14. The system as recited in claim 5, wherein said electrical generator is mounted around a propeller shaft which drives said rotor hub, said propeller head driven by said gearbox.

15. The system as recited in claim 14, further comprising a controller within said rotor hub, said controller in electrical communication with said electrical generator and said pitch change system.

16. The system as recited in claim 15, further comprising a low power control signal communication system which communicates control signals from the stationary frame of reference to the controller.

17. The system as recited in claim 15, further comprising a connector within said rotor hub, said connector operates to provide power and control signals from an external source to said controller.

18. The system as recited in claim 1, wherein said electrical generator is mounted across a rotational reference frame and a stationary reference frame to generate electric power from differential rotation between said rotor hub and said gearbox.

19. A method as recited in claim 10, wherein generating electrical power further comprises driving an electrical generator with the relative rotation between a stationary frame of reference and the rotational frame of reference.

* * * * *